July 4, 1967 R. H. MARTIN 3,329,273
ALTERNATIVELY SELECTED WASH AND INLET FLOW FOR FILTER SYSTEM
Filed Jan. 14, 1965 2 Sheets-Sheet 1

INVENTOR.
RAND H. MARTIN
BY
Warren T. Jessup
ATTORNEY

July 4, 1967  R. H. MARTIN  3,329,273
ALTERNATIVELY SELECTED WASH AND INLET FLOW FOR FILTER SYSTEM
Filed Jan. 14, 1965  2 Sheets-Sheet 2

INVENTOR.
RAND H. MARTIN
BY Warren T. Jessup
ATTORNEY

United States Patent Office 3,329,273
Patented July 4, 1967

3,329,273
ALTERNATIVELY SELECTED WASH AND INLET
FLOW FOR FILTER SYSTEM
Rand H. Martin, Monterey Park, Calif., assignor to HPE
Inc., El Monte, Calif., a corporation of California
Filed Jan. 14, 1965, Ser. No. 425,519
2 Claims. (Cl. 210—332)

This invention relates in general to filter systems for water, and in particular, to a combination valve for alternately supplying water into a filter, or in a jet-washing action upon the filter.

Filters employing diatomaceous earth are generally constructed of some porous cloth material through which the water can flow with relative ease. This cloth material will remove larger particles but will not take out the fine particles that are necessary for clear, sanitary swimming pool water. The diatomaceous earth is then collected upon the cloth as a water dispersion of the earth is filtered.

One such filter system has been successfully used in conjunction with home swimming pools. This system employs a container tank, having a stack of individual filter frames. The frames jointly constitute an outlet system from the tank. This filter device is placed in service by allowing water to flow through the tank and cover the filter, and then a quantity of diatomaceous earth is introduced and mixed into the water. As the filters attempt to remove the diatomaceous earth, it builds up on the surface of the filters and forms a uniform deposit of exceedingly fine filter material. Later, small particles in water passed through the filter will become entrapped in this layer of diatomaceous earth, but the water itself can readily pass through the minute interstices.

When the diatomaceous earth becomes so filled with material removed from the water, it must be rinsed away and a new supply placed over the surface of the filtering device. Heretofore, it has been the custom to project a jet of water over the surfaces, either by taking the filters to a remote spot from the filter tank, or by turning off the filtering action and opening a drain plug in the bottom of a tank. In such instance, a garden hose is generally employed to bring water to bear upon such filters and wash the surfaces clean. The old filter earth is thus washed out the drain opening to waste.

Therefore, it is in object of this invention to eliminate the need to provide a separate water supply for washing the filter surfaces free of diatomaceous earth filter media.

It is a further object of this invention to provide a direction valve which employs parts engaged by water pressure for simplicity of structure.

It is still a further object of this invention to provide a washable filter system with a wash jet that is activated by a valve action without stopping the filtering pump.

Other objects and a fuller understanding of the invention may be had by referring to the specification and claims which follow, which are described in conjunction with the following drawing in which:

Figure 1:
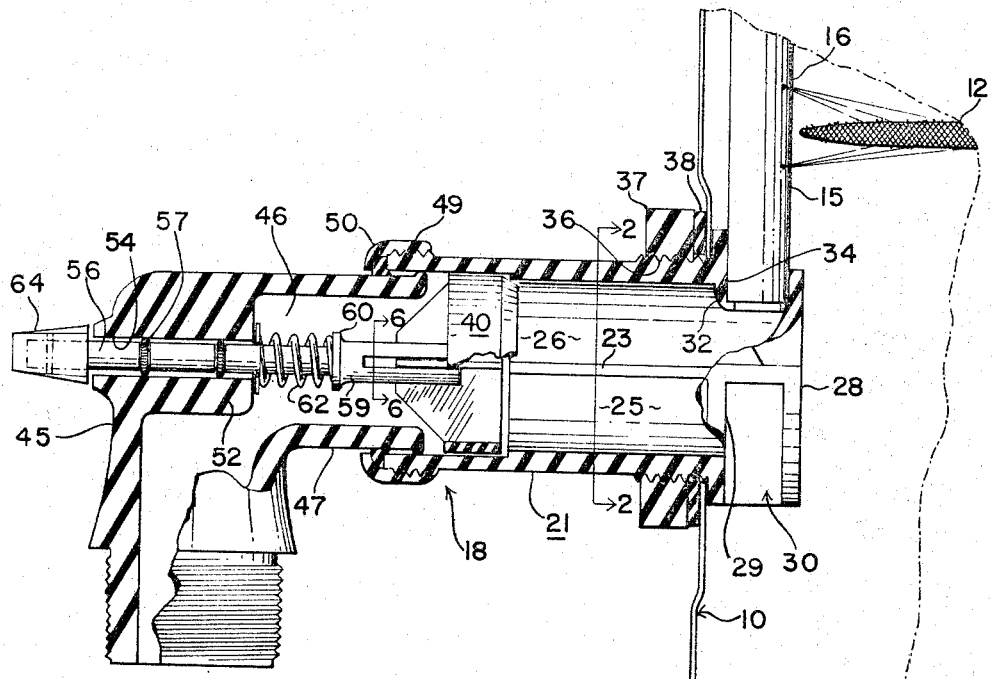
FIGURE 1 is a section view through the improved directional-flow valve, together with a fragmentary portion of a filter tank and one filter medium.

With particular reference to the drawings, in FIGURE 1, only a brief section of the tank 10 is shown, because such tanks are conventional and well known. Within the tank 10, there is illustrated a covered frame 12. Frame 12 is illustrative of the general type of filter device common in use for filtering of water. Only one such frame 12 is shown in FIGURE 1 in order to simplify the illustration and discussion to teach the invention. However, it is common practice to provide an annular frame having a central tubular hub, and to cover the frame with a cloth material to hold a layer of diatomaceous earth. These frames are then stacked one on the other in order that the central tubular hubs will cooperate to produce a longitudinal tube which will collect water flowing through the annular portions of the filter devices and direct the water through the tube to an outlet of the system. For the purpose of this illustration and discussion, the covered frame itself will be referred to as being connected to deliver water from the tank 10 to an outlet. That is, frame 12 is an outlet for the purpose of this discussion.

A waste plug 13 at the bottom of tank 10 will permit the tank to be drained and, hence, will divert water from the outlet 12 and cause this water to flow to waste.

A tube 15, having jet openings 16 therein, constitutes a tube nozzle means extending along the wall of tank 10. The jet openings 16 are drilled at such angle and rotary location that water under pressure supplied to tube 15 will project out along the respective surfaces of the covered frame 12 and remove the loose diatomaceous earth by hydraulic action.

A directional-flow valve 18, illustrated best in the FIGURE 1, is provided to supply water to the tank 10 for the purpose of causing that water to be filtered and passed through the outlet for useful purposes, or alternatively to provide the water under pressure to jet from the openings 16 and wash the covered frame outlets 12. Water is supplied from a suitable source, which normally is the swimming pool, by means of a water supply pump 19, indicated symbolically in the FIGURE 1.

The directional-flow valve 18, in this preferred embodiment, is composed of a barrel 21, having a longitudinal middle wall or partition 23. The provision of partition 23 thus creates a lower passage 25 and an upper passage 26, longitudinally through the barrel 21. End wall 28 closes the passageways. An opening 30 is then provided from the passage 25 to enable water flowing through the passage 25 to exhaust into the tank 10.

Figure 2:
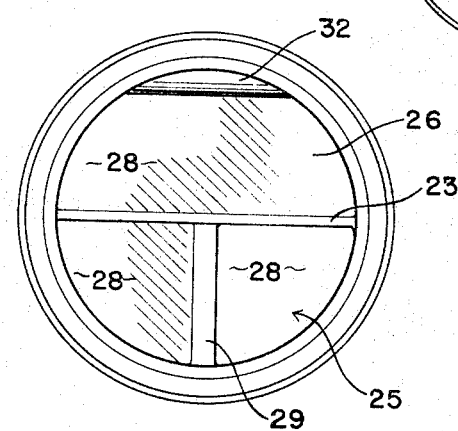
FIGURE 2 is a section view taken along line 2—2 of FIGURE 1.

In FIGURE 2, the passageways 25 and 26 may be seen as viewed directly down the barrel. Notice that in such view the end wall 28 is seen at the end of the barrel. Also, a strengthening rib 29 appears in this view, and may be seen from the side in FIGURE 1. Water in the passageway 25 passes on both sides of this strengthening rib 29 and out of the opening 30 into the tank 10.

A fillet 32 is provided in the top end of passage 26 for the purpose of providing structure in which a socket 34 is molded. The tube 15 is cemented into socket 34, and the socket creates an outlet opening from the passageway 26 through the tube 15. Normally, the tube 15 will be capped in order to create a high jet pressure from the openings 16.

An external thread 36 on the barrel 21 enables a nut 37 and packing 38 to seal the barrel in the wall of the tank 10 to prevent leakage.

Figure 3:
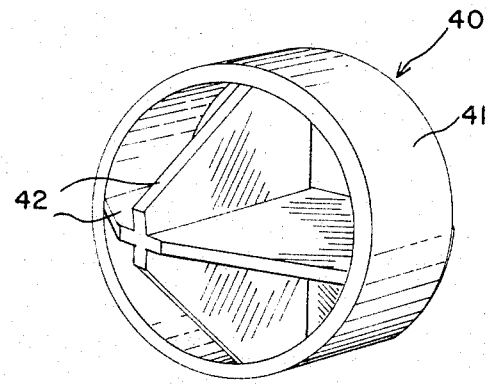
FIGURE 3 is a perspective view of valve frame employed to direct water.
Figure 4:
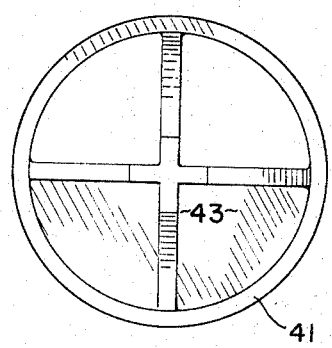
FIGURE 4 is a rear elevation view looking into the valve frame of FIGURE 3.
Figure 5:
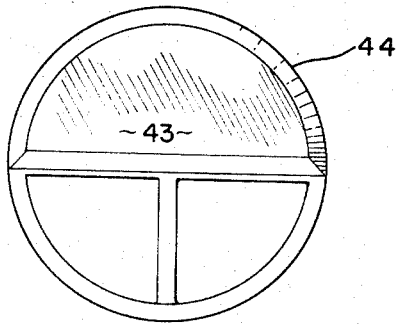
FIGURE 5 is a front-face view of the valve frame.

A valve frame 40 is employed to control the flow of water through the passages 25 and 26. For a better understanding of the valve frame 40, reference is made to FIGURES 3, 4, and 5. The perspective view of FIGURE 3 illustrates better the construction of an annular rim 41 and baffles 42 which constitute the structural frame of the member 40.

A semi-circular wall 43 blocks off half of the opening through the rim 41. See FIGURE 5. The wall 43 is tapered inwardly from the outside diameter of the rim 41 to produce a conical wall 44. This surface location of the wall 43 provides a projecting edge along the horizontal web 42, which locks against the front edge of partition wall 23 to discourage unintentional rotation of the frame 40 under vibration conditions. Note that there is nothing to restrain the frame 40 against longitudinal movement. It is held tightly against the partition 23 by reason of the action of water flowing through the barrel. The frame 40 is able to move in the opposite direction against such water force by applying a rotary driving force, in order to permit the wall 43 to act by cam action on the end of partition wall 23.

The directional-flow valve also includes an elbow fitting 45, which provides an inlet chamber 46 substantially aligned with the barrel portion 21. Wall 47 of the elbow fitting 45 is proportioned to fit inside the entrance to barrel 21 and is then sealed against water leakage by means of a nut 49 threadably engaged on the end of the barrel 21. Nut 49 is provided to compress a gasket 50 and thus seal the gap between the two parts of the valve 18, but permit a degree of axial shifting in order to align the supply line with the barrel, because the barrel is held rigidly on the tank 10.

A fillet 52 in the corner of the elbow fitting 45 provides structural strength and body for a through opening 54 axially aligned with the longitudinal axis of the barrel 21.

Through the opening 54, a shaft 56 is provided to drive the frame 40 in a rotary motion for water direction selection. The shaft is sealed by means of O rings seals 57.

Figure 6:
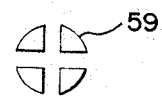
FIGURE 6 is a section view taken along line 6—6 of FIGURE 1.

The end of shaft 56 is bifurcated in two directions to produce a four-pronged fork 59. The nature of the end is best seen in FIGURE 6. By reason of this four-way slotting of the end 59, the shaft will slip over the four sections of the walls 42 and thus provide a rotary driving inter-connection, but will not limit the frame 40 against its freedom to move longitudinally. Thus, as the shaft is rotated, the frame 40 will cam itself rearwardly against the action of the water flowing through the chamber and this rearwardly movement is accommodated by the depth and looseness of the fit of the cross slots in the end 59.

Also, the end 59 is fitted with a shoulder 60, and a coil spring 62 is positioned between the end of fillet 52 and the shoulder 60 in order to urge the shaft 56 to a forward position and prevent accidental disconnection of the end 59 from the frame 40.

Figure 7:
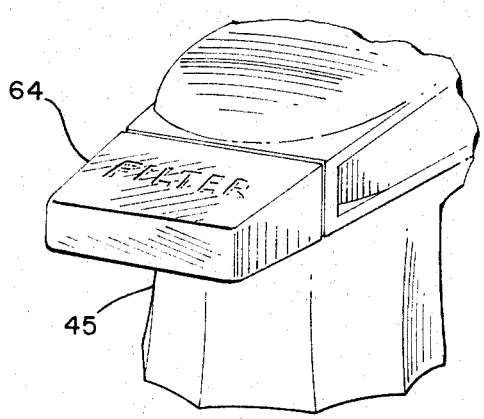
FIGURE 7 is a perspective view of the handle control for the valve frame.

To make the shaft 56 easily operable, a handle 64 is fastened on the external end thereof. This handle is shown in perspective view in the FIGURE 7. Lettering is supplied on the opposite surfaces to indicate whether the valve is directing water to the filter or to the wash action of the nozzle means. Detent devices, which are not shown, are employed to help hold the shaft 56 against unintentional rotation, and these devices are easily disengaged by the provision of a degree of longitudinal movement of shaft 56.

Accordingly, as thus shown and described, this filter is quickly converted from a filtering operation to a washing and renewal operation with a minimum of effort and loss of filtering time by the simple expedient of turning the shaft 56 to rotate frame 40 and cause the flow of water to be diverted from the passageway 25 to the passageway 26 and the tube 15. Then, the plug 13 is removed from the tank 10 to allow the water to exhaust to waste rather than through the standard outlet. The filter material is thus washed from the surface of the covered frame 12 and caused to flow to the bottom of the tank and out the opening 13.

After the covered frame 12 has been sufficiently cleaned, the plug 13 is restored and the frame 40 rotated to again divert water through the passageway 25 to fill the tank 10. At this time, a quantity of fresh diatomaceous earth is supplied and this new quantity clouds through the tank and then finds its way to the filter frames 12, where it is deposited to once again cause water following thereafter to be filtered through the new layer of diatomaceous earth.

While the instant invention has been shown and described herein in what is conceived to be the most practical and preferred embodiment, it is recognized that departures may be made therefrom within the scope of the invention which is, therefore, not to be limited to the details disclosed herein, but is to be afforded the full scope of the invention as hereinafter claimed.

What is claimed is:
1. A water filter system, comprising:
a filter tank;
a filter plate in said tank, said plate having a frame with a permeable cover, an outlet from the interior of said plate connected to the exterior of said tank, and a removable deposit of filter media coating said cover;
an inlet conduit through the wall of said tank, said conduit having an inlet chamber and a bifurcated outlet portion, said bifurcated portion having a first passageway leading to an exit port directly into said tank;
a nozzle means for directing a plurality of water jets onto the surfaces of said plate, said bifurcated portion having a second passageway leading to said nozzle means; and
baffle means for selectively closing one of said first or second passageways alternatively.

2. A water filter system, comprising:
a tank having a first outlet for filtered water and a second outlet to waste;
a filter system in said tank, having a renewable filter media surface washable by a water jet stream, said system connected to deliver water from said tank to said first outlet;
a bifurcated barrel extending through the wall of said tank, said barrel having a middle wall of partition, dividing said barrel into two passageways, one opening into said tank through an entrance port, tube nozzle means extending along said tank wall, the other said passageway leading to said tube nozzle means, said tube nozzle means having jet outlets for directing water jets against said surface to wash away used filter media;
a valve frame having a semi-circular baffle wall proportioned to close off either one or the other of said two passageways, said frame being rotatable in said barrel at the end of said partition wall for positioning said baffle wall over a selected one of said passageways;
an elbow conduit means for delivery of water to said barrel, said elbow conduit having a first section axially aligned with said barrel; and
a control shaft extending through the wall of said elbow and fitted to said valve frame, said shaft being rotatable about its axis, said frame thereby being rotatably driven to said passageway cover positions by rotation of said shaft.

References Cited

UNITED STATES PATENTS

| | | | |
|---|---|---|---|
| 894,679 | 7/1908 | Melvin | 210—409 |
| 2,854,142 | 9/1958 | Baker | 210—332 |
| 2,993,513 | 7/1961 | Hyde | 137—610 |

REUBEN FRIEDMAN, *Primary Examiner.*

SAMIH N. ZAHARNA, *Examiner.*

W. S. BRADBURY, *Assistant Examiner.*